United States Patent
Czajkowski et al.

(10) Patent No.: US 7,100,048 B1
(45) Date of Patent: Aug. 29, 2006

(54) ENCRYPTED INTERNET AND INTRANET COMMUNICATION DEVICE

(75) Inventors: David Czajkowski, Encinitas, CA (US); Bernard Gudaitis, Palos Verdes Estates, CA (US)

(73) Assignee: Space Micro Inc., San Diego, CA (US)

( * ) Notice: Subject to any disclaimer, the term of this patent is extended or adjusted under 35 U.S.C. 154(b) by 0 days.

(21) Appl. No.: 09/490,941

(22) Filed: Jan. 25, 2000

(51) Int. Cl.
*G06F 1/24* (2006.01)

(52) U.S. Cl. .................. 713/168; 713/189; 713/153

(58) Field of Classification Search .......... 713/168, 713/189, 153
See application file for complete search history.

(56) References Cited

U.S. PATENT DOCUMENTS

| | | | |
|---|---|---|---|
| 4,924,513 A * | 5/1990 | Herbison et al. ........... 713/161 |
| 5,416,842 A * | 5/1995 | Aziz ............................ 380/30 |
| 5,657,390 A * | 8/1997 | Elgamal et al. ............. 713/151 |
| 5,761,306 A | 6/1998 | Lewis |
| 5,835,603 A | 11/1998 | Coutts |
| 6,014,444 A | 1/2000 | Nakamura |

OTHER PUBLICATIONS

Hice, G.F. and Wold, S.H., DMS Prologue to the Government E-Mail Revolution, 1995, JG. Van Dyke & Associates, Inc.*
PC Guardian, Inc., EPlus Secure Export, PC Guardian Website (www.pcguardian.com/software/secure_s.html).

* cited by examiner

*Primary Examiner*—Thomas R. Peeso
(74) *Attorney, Agent, or Firm*—Brian Swienton

(57) ABSTRACT

A method and apparatus for providing multiple layer encrypted Internet, Intranet, or e-mail communication device communications. In particular, the process of encrypting Internet, Intranet, or e-mail messages with encryption algorithms embedded in integrated circuits incorporated into the communication device, with access to the encrypting circuit requiring a validation of a randomly generated cypher key and an user defined password.

20 Claims, 4 Drawing Sheets

TYPICAL COMPUTER

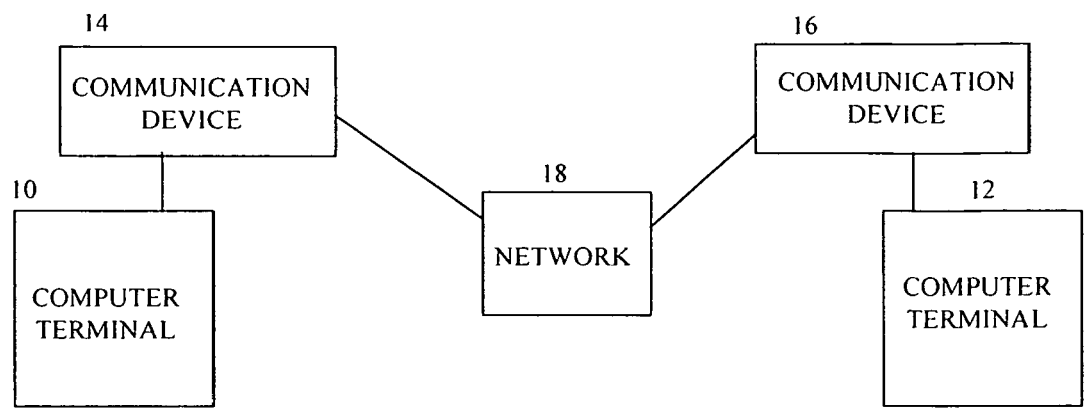
FIGURE 1 of 4 COMMUNICATION NETWORK

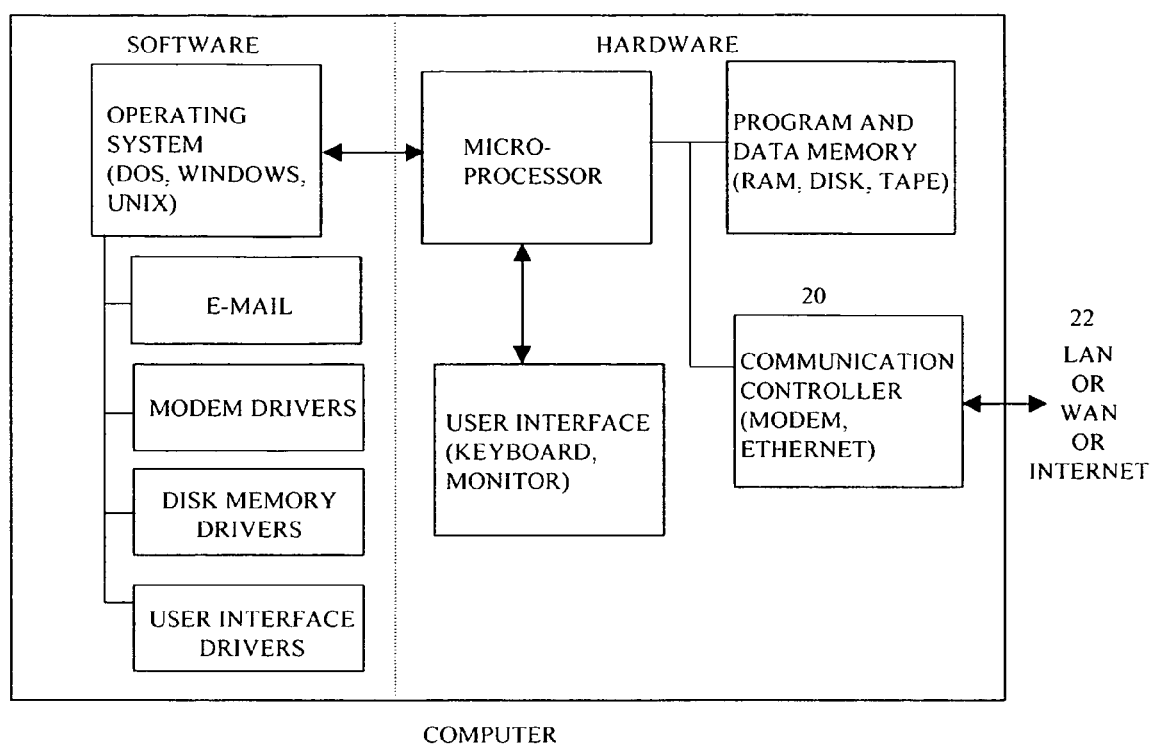
FIGURE 2 of 4 TYPICAL COMPUTER

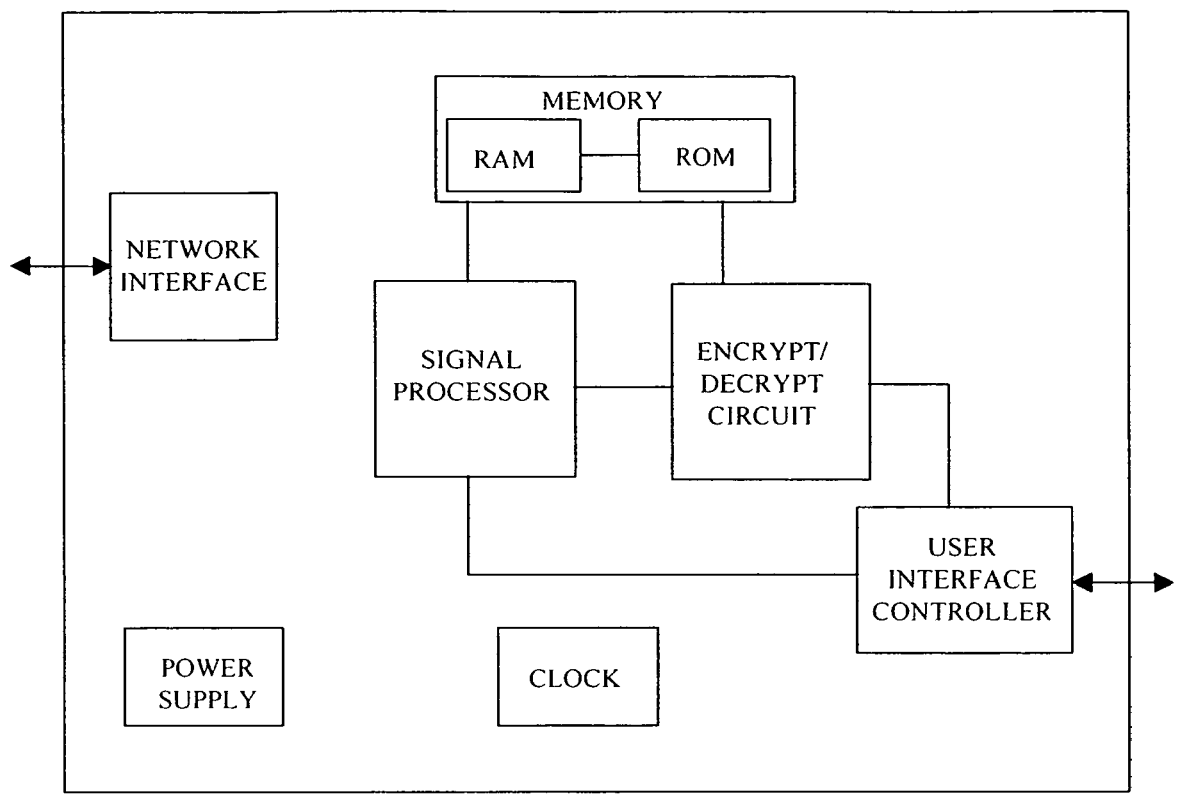
FIGURE 3 of 4 ENCRYPTION/DECRYPTION COMMUNICATION DEVICE

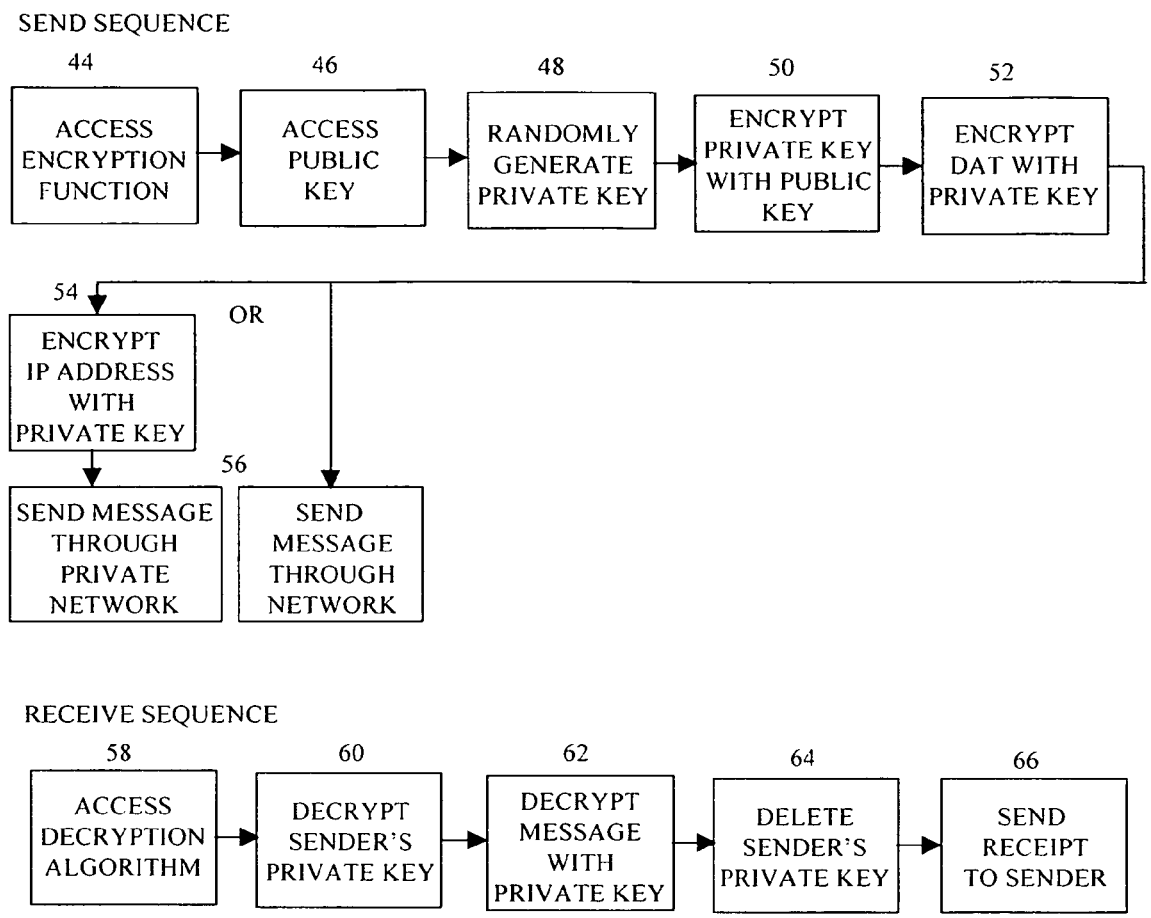
FIGURE 4 of 4    ENCRYPTION/DECRYPTION FLOW

ENCRYPTED INTERNET AND INTRANET COMMUNICATION DEVICE

CROSS-REFERENCE TO RELATED APPLICATIONS

Not Applicable

BACKGROUND

1. Field of Invention

This present invention relates a method for providing a secure encrypted computer communication channel across the Internet, more particularly, the use of e-mail access software and the addition of an integrated circuit embedded with several encryption algorithms to a communications device, thereby providing encryption/decryption capabilities.

2. Description of Prior Art

Typical communication between two or more parties through the Internet 18 using a computer, 10 and 11 is accomplished through the use of a communications devices, 14 and 16 and communication software as referenced in FIG. 1. A computer with communication capabilities, as reference in FIG. 2 will utilize a communication controller 20 to interface with the Internet 22. The Internet consists of many public domain computers, electronic routers and switches, and computer servers generally accessible by the public. Accessing this network is not controlled by any individual organization and is not limited in any ways other than by protocol definitions (TCP, IP, etc).

Communication on the Internet between two parties can take place using two different methods:

1. Sending data: when one party groups a message and/or data package into a specific formatted sequence, attaches the Internet address, termed an Internet Protocol (IP) Address and then sends the message and IP Address to the Internet. The data is typically packetized using commercially available software and sent from the computer through the communication device onto the Internet.
2. Accessing data: when one party connects to a public or private database across the Internet by connecting to the database's website. Access is typically made by using the communication device to connect to the website's URL Address.

Originally, the security of these communications was not an issue as very few individuals possessed the necessary computer hardware or technical expertise to intercept the messages. However, the arrival of inexpensive personal computers and the explosion in the popularity of the Internet, in particular electronic commerce (e-commerce), prompted the development of computer communication security devices.

The existing method of security that presently exists is computer software programs that encrypt communication data between two users using encryption algorithms, such as the Blowfish algorithm U.S. Pat. No. 6,014,444 relies an cypher key approach for encryption. These methods involve using a key, known by both the sender and receiver, which is used by the encryption algorithm to encode the data into an unrecognizable format. The data is then passed from the sender to the receiver. After successful transmission, the receiver has an encrypted data package. The receiver must then get the key from the sender and use it to re-run the same decryption algorithm to decrypt the message. An example of this software is found in the 1999 PC Guardian Incorporated "Encryption Plus for Email" product datasheet.

The security of these software encryption systems may be compromised as the software (therefore the encryption algorithm) may be subject to computer hacking. Furthermore, the myriad of encryption software has led to incompatibilities. One encryption program is generally incompatible with a competing company's software. Therefore, the sender and the receiver must be using the same program. Lastly, once the encryption algorithm has been compromised, messages encrypted with the algorithm may easily decrypted. A person located external to the communications network may intercept and decrypt the message if the software has been effectively "hacked".

A different security approach has involved the use of computer smart cards. U.S. Pat. No. 5,761,306 provides other improved methods of encryption involving a system of computers to exchange public keys over an insecure network. These systems rely on a combination of nodes that are implemented by a computer, smart card, a stored data card in combination with a publicly accessible node machine. This system, however, will still depend on the effectiveness of the underlying encryption software and require the user to possess a smart card to effectively operate. Additionally, these software encryption systems generally only provide single layer encryption, in that the entire message will be encrypted using one algorithm.

U.S. Pat. No. 5,835,603 describes a home banking system using an encrypted modem as part of its system. This system is similar to all standard encryption techniques, but differs from the present invention in that it does not specify asymmetric and symmetric encryption functions embedded into an integrated circuit. Additionally, it does not utilize an Internet IP Address as part of its encryption system and does not offer any solutions for decryption.

Therefore, it is further desirable to have the encryption algorithm encoded onto a integrated circuit within the communication device. As such, hacking into the encryption chip would require purchasing an encryption chip and reverse engineering the chip to the underlying physical operations. In addition, for a large number of electronic network users, the private keys should be securely transmitted over the network.

SUMMARY

The present invention discloses an apparatus and method for providing secured information exchange through the Internet and Intranet, consisting of a computer communications device containing an integrated electronic circuit embedded with asymmetric and symmetric encryption/decryption algorithms.

According to the present invention, furthermore, there is provided a multiple step process which is added to existing standard Internet communication sequences for both sending and accessing data to implement the encryption procedure.

Other features of the present invention will become apparent from the accompanying drawings and from the detailed description which follows.

OBJECT AND ADVANTAGES

The present invention provides advantages over existing prior art in that:
(a) The inclusion of a hard wired integrated circuit containing embedded encryption algorithms into the computer communication device provides increased security over current software encryption systems. One wishing to discover the encryption algorithm would be required reverse engineer the chip down to the operational level (examine the gates and transistors comprising the chip function), as opposed to external program hacking to which a software-only system is susceptible. Such an effort would not generally be cost effective.

(b) Secure automatic electronic private key transmission between sender and receiver.

(c) The communication device with the integrated circuit, when installed in a computer, contains all the encryption hardware and software. No additional encryption technology is required to be purchased and installed.

(d) The process accompanying the present invention when incorporated to existing Internet communication sequences will require verification of the receiver's Internet or IP address before transmitting the encrypted data. Current systems do not require verification of the recipient's Internet or IP address.

BRIEF DESCRIPTION OF THE DRAWING

The present invention is illustrated by way of example, and not by way of limitation, in the figures of the accompanying drawings and in which like reference numerals indicate similar elements and in which:

FIG. 1 is a block diagram of a typical communication network.

FIG. 2 is a block diagram of a computer with a communications device.

FIG. 3 is a block diagram of an encryption/decryption communication device in accordance with an embodiment of the present invention.

FIG. 4 is a flow chart of the encryption/decryption method in accordance with an embodiment of the present invention.

DETAILED DESCRITPION OF THE PRESENT INVENTION

The present invention contains all the functions necessary for secure communications in one physical device as referenced in FIG. 3. This device contains an encryption and decryption integrated circuit 30 that uses a combination of asymmetric and symmetric functions to encrypt and decrypt data. The encryption/decryption integrated circuit can be accessed by the user through a password protected user interface controller 32. This communication device also contains a signal processor 34 used to process the incoming and outgoing data. This may include multiplexing, demultiplexing, modulating, demodulating, encoding, decoding, and error detection and correction. Memory 36 is included within the device for algorithm, control, and data storage. A network interface 38, electrical power 40, and a clock for internal timing 42 is also part of the communication device.

The present invention involves a multiple step process which is added to existing standard Internet communication sequences for both sending and accessing data. A primary private key is encrypted using a public/private key pair, then the remainder of the data is encrypted with a faster algorithm using another randomly generated primary key. An Encrypted Internet Communication System is required at both the sender and receiver for successful secure transmission. The verification process is completed using a set of software and hardware verification steps that unlock the encryption algorithm hardware to the receiver. The process involves a communication setup, a sender sequence and a receiver sequence. The process is as follows:

Communication Setup

When the communication device and associated software is installed into the computer, the following sequence is followed to setup levels of security:

1. The software requests a password from the user, either the sender or receiver.
2. The software converts the password to a digital, electronic bit format and transfers the digitized password to the communication device hardware, which stores the password permanently into a non-volatile hardware register.

Send Sequence

1. To access the encryption algorithm, the user must successfully re-enter the password into the software and matched in the hardware during the send sequence 44.
2. Sender requests encryption access from software.
3. Software asks for password from sender. (Steps 3 and 4 are optional).
4. Software compares password with previously stored password during the Communication Setup sequence of communication system if matched, encryption algorithm is made available to sender. If not matched, encryption algorithm is not made available to sender. (Steps 3 and 4 are optional).
5. Data is passed through encryption hardware in communication device. The data encryption is performed in the following manner as referenced in FIG. 4:

a. the communication device accesses the receiver's public key. A Certification Authority (CA) is used to verify the receiver's public key 46.

b. the sender randomly generates its private key 48 c. the sender's private key is encrypted using the receiver's public key 50 d. the sender's data is encrypted using the sender's private key 52 e. the receiver's Internet Protocol's (IP) address is acted upon in one of the following ways:
      i) the receiver's IP address is not encrypted
      ii) a copy of the receiver's IP address is encrypted using a private key (different private key from the one encrypting the message) 54 f. the IP address, encrypted copy of the IP address (if ii is performed), encrypted private key, and encrypted message is transmitted as a message block to the receiver. If the IP address is encrypted the message block could be sent to the receiver through a private network to verify the receiver. If the IP address is not encrypted, the message block is sent to the receiver through normal channels 56.

Receive Sequence

1. After message data received by receiver, receiver requests software to de-encrypt data 58.
2. Software requests a password to communication device; receiver enters password.
3. Software transfers receiver password to communication device. Compare of password is completed by communication device. If matched, de-encrypt sequence is allowed to continue. If not matched, sequence is halted and error message is passed back to software.
4. Software then sends a un-encrypted e-mail on to the Internet through the communication device that provides a return message to the same (receiver) IP Address. The message will include a unique code to signify a verification check (unique verification code) and the IP Address. Numerous techniques can be used to verify the e-mail has reached the actual Internet, such as, use of "Certification Authority", reading the Domain Name Server and returning verification data and/or use of a private server that provides a return of the e-mail with verification of reaching the Internet. In all cases, the message will return to the receiver IP Address along with the unique verification code.

5. If the receiver's IP address is verified then the encryption of the data can proceed.
6. Software then transfers data to communication device.
7. The receiver's private key (as part of its private/public key pair) is then used to decrypted the sender's private key 60.
8. Then the receiver uses the sender's private key to decrypt the message 62.
9. The receiver's communication device deletes the sender's private key 64.
10. The receiver's communication device sends a message receipt to the sender 66.

CONCLUSIONS, RAMIFICATIONS, AND SCOPE OF INVENTION

Accordingly, the reader will see that the present invention provides multiple layer of encryption, yet will not impinge on the operational utility of the computer communications device. Furthermore, the apparatus and process outlined above prevents or efficiently deters external computer theft of sensitive information. Lastly, the apparatus and process may be upgraded with the addition of different algorithms.

While the above description contains many specifications, these specifications should not be construed as limitations on the scope or utility of the invention, but are presented to exemplify a preferred embodiment thereof.

Accordingly, the scope of the invention should be determined not by the embodiments presented, but by the appended claims and their legal equivalents.

The invention claimed is:

1. A method for efficient encryption and decryption of Internet, Intranet, or e-mail messages, comprising the steps of:
    providing a sending unit in communication with an integrated encryption circuit embedded with an encryption algorithm;
    encrypting a message at said sending unit;
    appending to the message at said sending unit a receiver's unencrypted IP address;
    appending to said message a receiver's encrypted IP address;
    sending said encrypted message with said unencrypted IP address and said encrypted IP address to a receiving unit;
    providing said receiving unit having an integrated encryption circuit embedded with a decryption algorithm;
    receiving with said receiving unit said encrypted message with said unencrypted IP address and said encrypted IP address;
    decrypting with said receiving unit said encrypted IP address, thereby resulting in a decrypted IP address;
    storing said decrypted IP address in a first register built into said integrated encryption circuit within said receiving unit;
    storing said unecrypted IP address in a second register built into said integrated circuit within said receiving unit;
    means for comparing said second register storing unencrypted IP address to said first register storing said decrypted IP address;
    decrypting said message if said second register storing said unencrypted IP address matches said first register storing said decrypted IP address; and
    means for halting decryption process if said second register storing said unencrypted IP address does not match said first register storing said decrypted IP address.

2. A method of encrypting Internet, Intranet, or e-mail messages, comprising:
    providing a communication device in communication with a private encryption key generator;
    generating a primary private encryption key;
    encrypting data with the primary private encryption key;
    providing a public encryption key and a second private encryption key pair;
    encrypting the primary private encryption key with the public encryption key and second private encryption key pair; and
    sending the data encrypted with the primary private encryption key and the primary private encryption key encrypted with the public encryption key and second private encryption key pair to a receiving unit.

3. The method of claim 2, wherein access to the private encryption key generator is password controlled.

4. The method of claim 3 wherein the password is user defined.

5. The method of claim 2 wherein said encryption key generator is located within a communication device.

6. The method of claim 2 wherein the primary private key is randomly generated.

7. A method of decrypting Internet, Intranet, e-mail messages, comprising:
    providing a communication device in communication with a private encryption key generator;
    receiving an encrypted message with the communication device, the message having data encrypted with a primary private encryption key and a primary private encryption key encrypted with a public encryption key and second private encryption key pair;
    providing access to the private encryption key generator;
    decrypting the public encryption key and second private encryption key pair with the primary encryption key generator, thereby providing the primary private encryption key; and
    decrypting the data with the primary private encryption key.

8. The method of claim 7 wherein access to the private encryption key generator is password controlled.

9. The method of claim 8 wherein the password is user defined.

10. The method of claim 7 wherein access to the primary encryption key generator requires verification.

11. The method of claim 10 wherein the verification comprises a Certificate of Authority.

12. A method of encrypting Internet, Intranet, or e-mail messages, comprising the steps of:
    providing a communication device in communication with an integrated encryption circuit embedded with encryption algorithms;
    accessing the integrated encryption circuit to encrypt a message;
    encrypting the message with the encryption algorithms;
    providing a message header comprising the sender's private cipher key and a digital bit array;
    encrypting the message header using a receiver's public encryption key;

appending the encrypted message header to the encrypted message; and transmitting the encrypted message header and the encrypted message to a receiver.

13. The method of claim 12 wherein the message is transmitted through an Internet.

14. The method of claim 12 wherein the message is transmitted through an Intranet.

15. The method of claim 12 wherein the message is transmitted through an e-mail.

16. The method of claim 12 wherein the message is transmitted through a wireless communication system.

17. A method of decrypting a message of claim 12 further comprising the steps of:

providing a communication device in communication with an integrated decryption circuit;

receiving an encrypted message and encrypted message header with the communication device;

accessing the integrated decryption circuit to decrypt the encrypted message and message header;

decrypting the message header with the decryption circuit;

validating the message header with the decryption circuit;

decrypting the message with the integrated decryption circuit; and deleting the private cipher key from the receiver's communication device.

18. An apparatus for encrypting and decrypting Internet, Intranet, and e-mail messages, comprising:

a communication device;

an integrated circuit in communication with the communication device;

a random private cipher key generator embedded within the integrated circuit;

asymmetric encryption and decryption algorithms embedded within the integrated circuit; and symmetric encryption and decryption algorithms embedded within the integrated circuit.

19. The device of claim 18 wherein the integrated circuit is capable of password protections, thereby requiring a password to access the integrated circuit.

20. The device of claim 19 wherein the password is user defined.

* * * * *